United States Patent [19]

Wheatley et al.

[11] Patent Number: 4,599,551
[45] Date of Patent: Jul. 8, 1986

[54] THERMOACOUSTIC MAGNETOHYDRODYNAMIC ELECTRICAL GENERATOR

[75] Inventors: John C. Wheatley; Gregory W. Swift, both of Los Alamos; Albert Migliori, Santa Fe, all of N. Mex.

[73] Assignee: The United States of America as represented by the United States Department of Energy, Washington, D.C.

[21] Appl. No.: 672,228

[22] Filed: Nov. 16, 1984

[51] Int. Cl.⁴ ............................................. H02N 4/02
[52] U.S. Cl. ..................................... 322/2 R; 310/11; 322/3
[58] Field of Search .......................... 322/2 R, 3, 100; 310/306, 307, 11; 60/516

[56] References Cited

U.S. PATENT DOCUMENTS

| | | | |
|---|---|---|---|
| 2,836,033 | 5/1958 | Marrison | 60/516 |
| 3,102,224 | 8/1963 | Maeder | 322/2 R X |
| 3,310,689 | 3/1967 | Heinmets | 310/11 X |
| 3,350,584 | 10/1967 | Brocher et al. | 310/11 |
| 3,549,915 | 12/1970 | Prem | 310/11 |
| 3,600,612 | 8/1971 | Beeken | 322/2 R |
| 3,710,153 | 1/1973 | Barbacsy et al. | 310/11 |
| 4,398,398 | 8/1983 | Wheatley et al. | 62/467 |

Primary Examiner—R. J. Hickey
Attorney, Agent, or Firm—William A. Eklund; Paul D. Gaetjens; Judson R. Hightower

[57] ABSTRACT

A thermoacoustic magnetohydrodynamic electrical generator includes an intrinsically irreversible thermoacoustic heat engine coupled to a magnetohydrodynamic electrical generator. The heat engine includes an electrically conductive liquid metal as the working fluid and includes two heat exchange and thermoacoustic structure assemblies which drive the liquid in a push-pull arrangement to cause the liquid metal to oscillate at a resonant acoustic frequency on the order of 1,000 Hz. The engine is positioned in the field of a magnet and is oriented such that the liquid metal oscillates in a direction orthogonal to the field of the magnet, whereby an alternating electrical potential is generated in the liquid metal. Low-loss, low-inductance electrical conductors electrically connected to opposite sides of the liquid metal conduct an output signal to a transformer adapted to convert the low-voltage, high-current output signal to a more usable higher voltage, lower current signal.

7 Claims, 5 Drawing Figures

THERMOACOUSTIC MAGNETOHYDRODYNAMIC ELECTRICAL GENERATOR

This invention is the result of a contract with the Department of Energy (Contract No. W-7405-ENG-36).

BACKGROUND OF THE INVENTION

The invention disclosed herein is generally related to acoustic engines and magnetohydrodynamic electrical generators. More particularly, this invention is related to engines in which a heat flow is used to induce resonant acoustic oscillation in a fluid.

The present invention is related to the invention disclosed and claimed in the applicants' previously filed U.S. patent application Ser. No. 445,650, entitled "Intrinsically Irreversible Heat Engine," now U.S. Pat. No. 4,489,553. The invention described therein is operable to convert thermal energy to acoustic energy in a fluid by means of an intrinsically irreversible thermodynamic process.

Various devices have been previously known to convert heat to acoustic energy and subsequently to electrical energy. For example, U.S. Pat. No. 2,836,033 to Marrison discloses an acoustic wave system in which heat is applied to induce acoustic oscillation in a gas, which oscillation is used to produce electrical signals by means of various types of electromagnetic transducers. The disadvantage of using conventional transducers as disclosed in Marrison, however, is that there are moving mechanical parts which must be mechanically coupled to the oscillating gas.

SUMMARY OF THE INVENTION

Accordingly, it is an object and purpose of the present invention to provide a thermoacoustic electrical generator for converting heat to electrical energy. More particularly, it is an object to provide such a generator having no moving mechanical parts.

It is also an object, for reasons which will be apparent below, to provide a thermoacoustic electrical generator having an efficiency which is a substantial fraction of the Carnot efficiency.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention as embodied and broadly described herein, the thermoacoustic electrical generator of the present invention comprises an intrinsically irreversible thermoacoustic engine, in which the working fluid is an electrically conductive liquid metal, coupled to a magnetohydrodynamic (MHD) generator for generating an alternating electric current. In the preferred embodiment an elongate housing containing a liquid metal is positioned in the magnetic field of a magnet. The housing contains, in addition to the liquid metal, a thermoacoustic structure and heat exchangers thermally coupled thereto, by which heat is introduced into and withdrawn from the liquid in such a manner as to induce and maintain resonant acoustic oscillation in the liquid. The housing is oriented so that the direction of reciprocal acoustic oscillation of the liquid metal is substantially orthogonal to the axis of the magnetic field. As a consequence of the reciprocal oscillation of the liquid in the presence of the magnetic field, an electric potential is produced in the liquid, which alternates at the frequency of the acoustic vibration of the liquid. The generator further includes electrical conductors connected to the liquid at opposite sides of the housing. More particularly, the conductors lie along an axis which extends substantially orthogonally with respect to both the axis of the magnetic field and the axis of reciprocal oscillation of the liquid.

Under normal operating conditions at acoustic frequencies, the generator produces an alternating current (ac) signal having a current on the order of 1,000 amperes and a voltage on the order of one volt. Accordingly, in the preferred embodiment the output of the generator is applied to a low-loss, low-inductance transformer to transform the output to a more usable electrical signal.

These and other aspects of the present invention are more fully set forth in the following description of a preferred embodiment and in the accompanying drawings.

BRIEF DESCRIPTION OF THE DRAWINGS

The accompanying drawings, which are incorporated in and form a part of the specification, illustrate a prefered embodiment of the present invention and, together with the description, serve to explain the principles of the invention. In the drawings.

DETAILED DESCRIPTION OF THE INVENTION

The extraction of electrical energy from an oscillating liquid by magnetohydrodynamic means requires that the oscillating liquid be electrically conductive, which essentially limits the liquid to liquid metals. The most appropriate liquid metals are the liquid alkali metals, particularly liquid sodium, liquid potassium, or the eutectic mixture of sodium and potassium. The eutectic mixture (78 weight percent potassium) has a melting point of $-12.6°$ C., and is thus a liquid at room temperature. All three of these liquids have low Prandtl numbers (the ratio of the kinematic viscosity to the thermal diffusivity of the liquid) and thus are ideal working fluids for the generator. Typical values of the Prandtl number for these liquids range from 0.004 to 0.007 at operating temperatures. These metals are also preferred over other possible metals, for example, liquid mercury, because of their relatively larger thermal expansion coefficients and relatively larger compressibilities.

Figure 1:
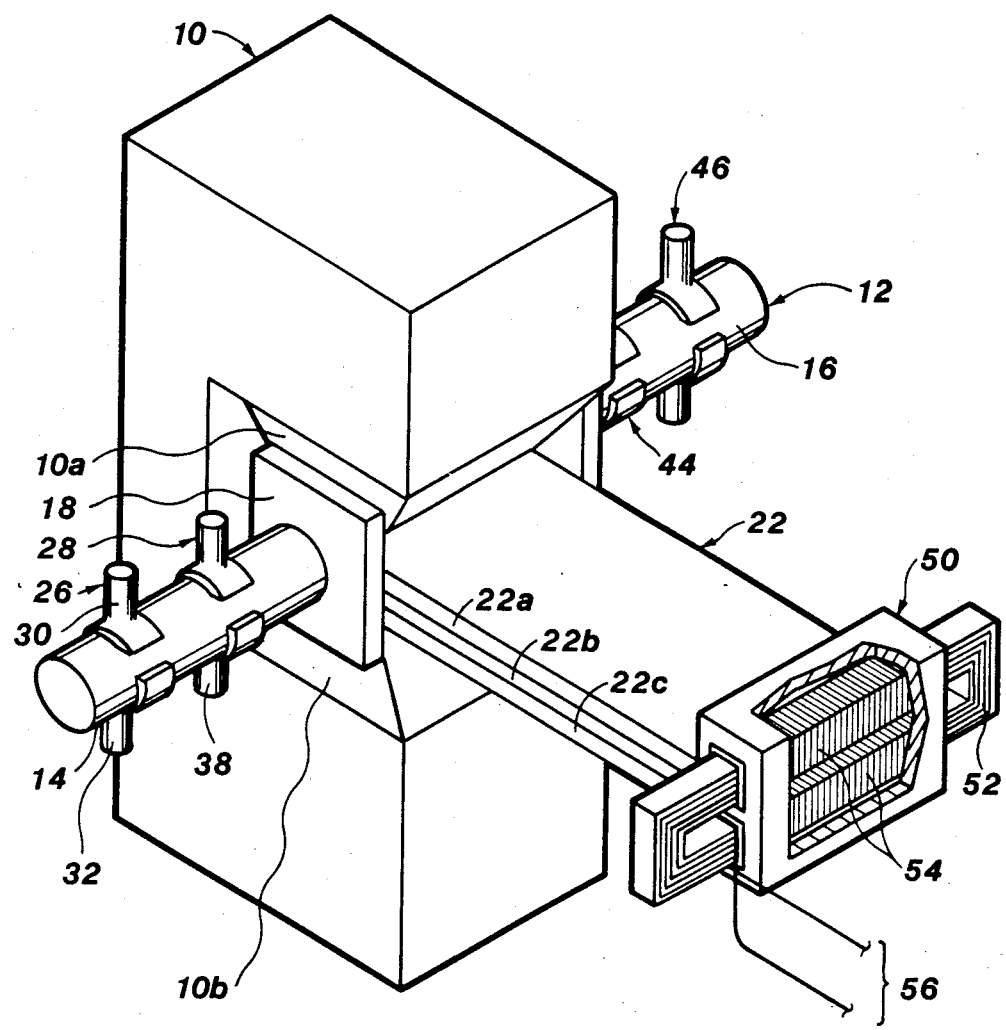
FIG. 1 is an isometric view of a preferred embodiment of the thermoacoustic magnetohydrodynamic electrical generator of the present invention.
Figure 2:
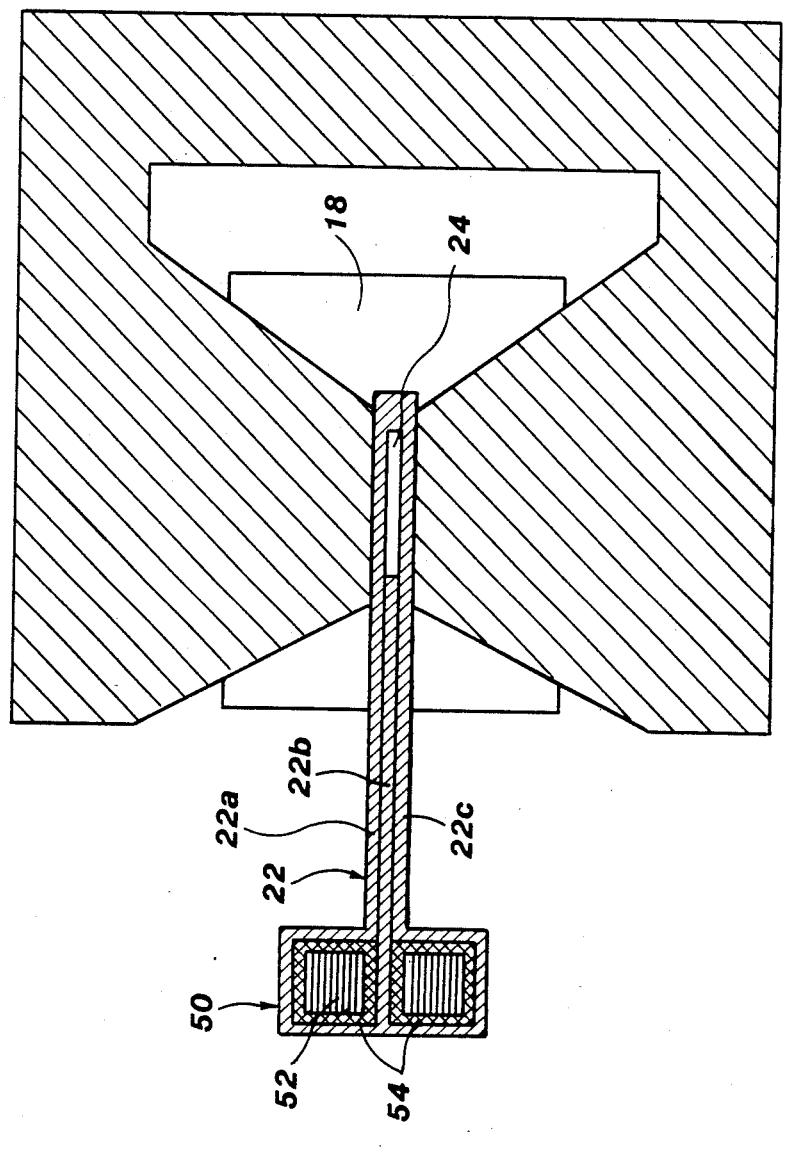
FIG. 2 is an end view in cross section of the thermoacoustic generator of FIG. 1.
Figure 3:
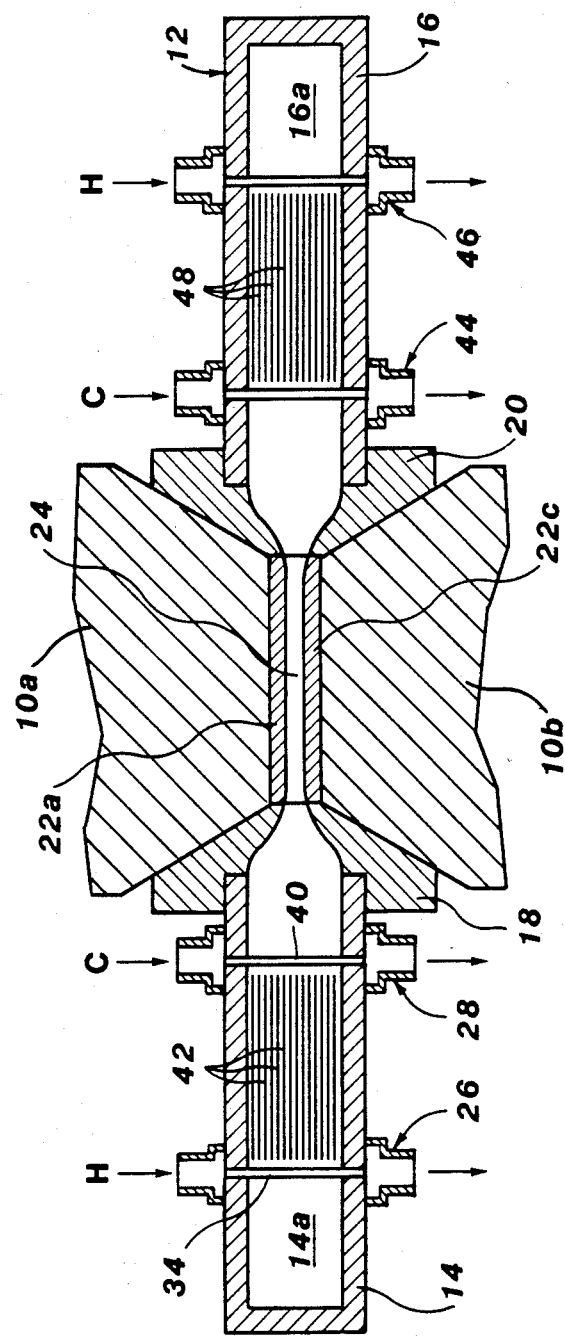
FIG. 3 is a side view in cross section of the generator of FIG. 1.
Figure 5:
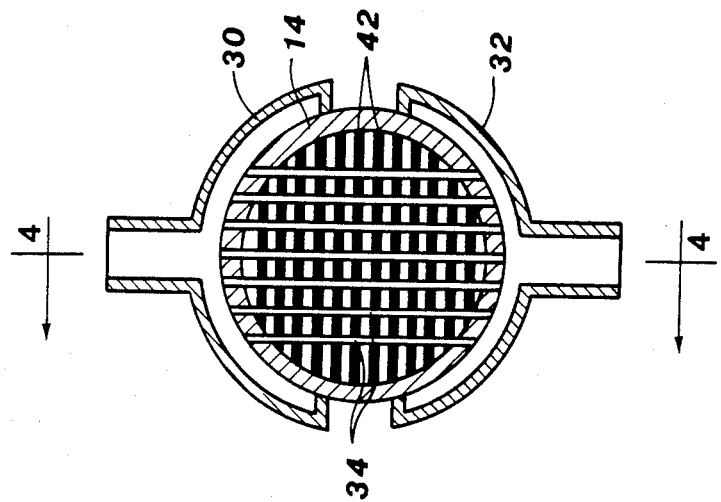
FIG. 5 is an end view in cross section of the heat exchange assembly of FIG. 4, taken along section lines 5—5 of FIG. 4.

FIGS. 1 through 3 illustrate a preferred embodiment of the invention. A permanent magnet 10 provides a magnetic field which extends between spaced pole pieces 10a and 10b. Positioned between the pole pieces 10a and 10b is a thermoacoustic engine 12. The engine 12 includes two coaxial cylindrical tubes 14 and 16 which extend outwardly from between the pole pieces of the magnet and which define cylindrical chambers 14a and 16a respectively. The tubes 14 and 16 are closed at their outer ends, and at their inner ends open into cross-section converters 18 and 20, respectively, which effectively transform the cylindrical cross section of the chambers 14a and 16a to a narrow rectangular cross section. Between the cross-section converters is a copper conductor assembly 22. The conductor assembly 22 consists of a stack of three heavy plate-like electrical conductors 22a, 22b, and 22c which extend outwardly from between the pole pieces. In the region between the magnet pole pieces the upper and lower conductors 22a and 22c extend beyond the end of middle conductor 22b and are integrally joined to one another so as to form a narrow rectangular chamber 24 which is centered between the magnet pole pieces. The chamber 24 opens into and is continuous with the tubular chambers 14a and 16a by means of the cross-section converters 18 and 20, such that there is effectively a single continuous chamber extending the entire length of the acoustic engine, consisting of the cylindrical chambers 14a and 16a smoothly tapering into the rectangular central chamber 24. The chamber is filled with liquid sodium, which is a preferred liquid alkali because of its low viscosity and desirable chemical characteristics.

The configuration of the conductor assembly 22 is dictated in part by two considerations. First, the electrical output of the generator is a high current, low voltage signal, so it is desirable to have conductors which have as little electrical loss as possible. Secondly, the conductor assembly 22, together with the magnet pole pieces and the cross-section converters 18 and 20, form a monolithic containment assembly which is suitable for containing the liquid sodium under the high dynamic pressures encountered during operation. Further, this arrangement permits the spacing between the pole pieces to be minimized, thereby maximizing the available magnetic field strength. The rectangular cross-section of the central chamber 24 is also selected for this purpose, with the dimension in the horizontal direction being maximized to maximize the electrical potential generated in the liquid sodium.

The three conductors 22a, 22b and 22c are separated by sheets of electrical insulation (not shown). Because of the low operating voltages involved, on the order of one volt, the electrical insulation may be very thin (25 microns or less) and may be made of any suitable dielectric material.

Figure 4:
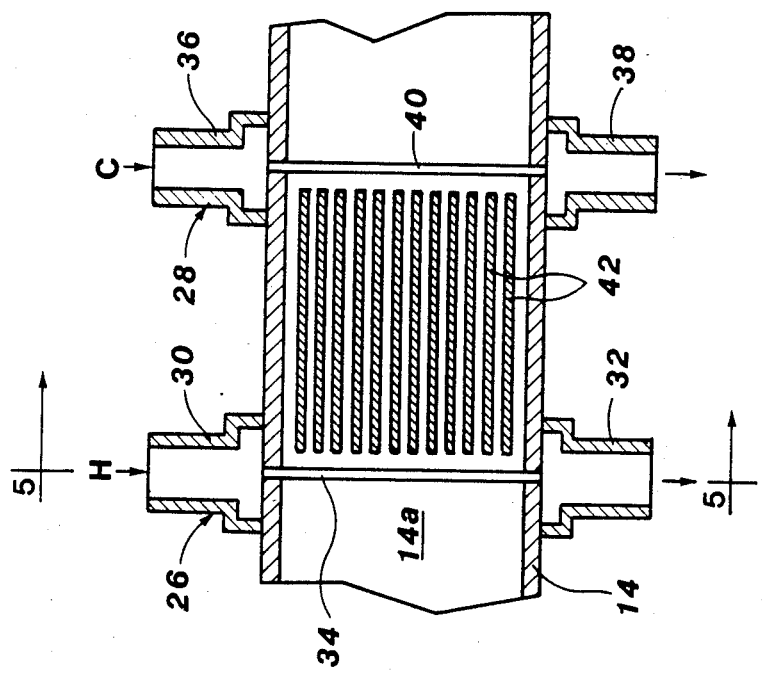
FIG. 4 is an enlarged cross-sectional side view of one of the thermoacoustic and heat exchange assemblies of the acoustic engine.

The tube 14 is provided with hot and cold heat exchange assemblies 26 and 28 by which heat is added to and removed from the liquid sodium. Referring to FIG. 4, the heat exchange assembly 26 includes upper and lower manifolds 30 and 32 which are affixed to the upper and lower sides of the tube 14. The manifolds 30 and 32 are connected by a plurality of thin heat exchange tubes 34. A hot fluid, preferably liquid sodium, is passed through the manifolds 30 and 32 and the tubes 34 so as to heat the liquid sodium in the chamber 14a in the region immediately adjacent the tubes 34. In the preferred embodiment the heat exchange tubes may be formed of 0.03-inch diameter stainless steel tubing (0.005-inch wall thickness).

The cold heat exchange assembly 28 is identical, including upper and lower manifolds 36 and 38 and heat exchange tubes 40. A suitable cold fluid is passed through the manifolds 36 and 38 and tubes 40 to remove heat from the liquid sodium in the chamber 14a in the vicinity of the tubes 40.

Between the heat exchange tubes 34 and 40 is a thermoacoustic structure consisting of a stack of thin metal plates 42 which are parallel to and spaced apart from one another and which span the inside diameter of the tube 14. In the preferred embodiment the plates may consist of 0.012-inch thick tungsten plates which are separated by spacings of approximately 0.013 inch. It will be noted that in the illustrations the heat exchange tubes 34 and 40 and the plates 42 are not necessarily to scale, being simplified for purposes of illustration.

The heat exchange tubes 34 and 40 are positioned as close to the ends of the plates 42 as possible, the object being to respectively heat and cool the opposite end edges of the plates 42. This results in reciprocal oscillation of the liquid sodium at acoustic frequencies on the order of 1,000 Hz. The oscillation is along the central longitudinal axis of the acoustic engine, which is in a direction orthogonal to the magnetic field. More detailed discussions of this phenomenon are set forth in the applicants' previously issued U.S. Pat. No. 4,398,398 and in their U.S. patent application Ser. No. 445,650 which is now allowed and which is hereby incorporated by reference.

The opposite tube 16 likewise includes hot and cold heat exchange assemblies 44 and 46, respectively, and a stack of metal plates 48. These elements are essentially identical to the equivalent elements described above with regard to tube 14. In operation, the two sets of plates 42 and 48, together with their respective heat exchange assemblies, drive the liquid sodium in a push-pull fashion.

Referring to FIGS. 1 and 2, the conductor assembly 22 is connected to a low-loss, low impedance transformer 50. The transformer includes a closed loop core 52 which is formed by a continuous winding of 0.002-inch thick, grain-oriented, nickel-iron tape (50% nickel, 50% iron). The upper and lower conductors 22a and 22c form a single wrap around the upper and lower arms of the core 52 and join the center conductor 22b, such that the conductors 22a, 22b and 22c together form a single primary winding around each of the upper and lower arms of the closed loop core 52.

Between the core 52 and the two primary windings formed by the conductor assembly 22 is a secondary winding 54 consisting of approximately 300 windings of a suitable wire conductor. The 300 windings are distributed approximately equally along the upper and lower arms of the core 52, with the windings on the upper and lower arms being connected in series and connected to output leads 56.

In operation, the liquid sodium oscillates in a half-wave acoustic resonance as a result of the heat added to and extracted from the liquid at the heat exchangers. For a generator operating at an average temperature of 450° C. and at a resonant frequency of 1000 Hz, and with the temperature difference between the hot and cold heat exchangers being on the order of 400° C., a half-kilowatt power output can be produced.

As a consequence of there being no moving mechanical parts, the present invention will be particularly useful in applications requiring high reliability and little or n maintenance. For example, the generator may be used in a space satellite, using a nuclear fission reactor as a heat source and using black body radiators as a heat sink.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enble others skilled in the art to best utilize the invention in various embodiments and with various modifications as are suited to the particular use contemplated. It is intended that the scope of the invention be defined by the claims appended hereto.

What is claimed is:

1. A thermoacoustic magnetohydrodynamic electrical generator comprising a magnet having a magnetic field, an elongate hollow housing containing an electrically conductive liquid and a thermoacoustic structure positioned in said liquid, heat exchange means thermally connected to said thermoacoustic structure for inducing said liquid to oscillate at an acoustic resonant frequency within said housing, said housing being positioned in said magnetic field and oriented such that the direction of said magnetic field and the direction of oscillatory motion of said liquid are substantially orthogonal to one another, first and second electrical conductor means connected to said liquid on opposite sides of said housing along an axis which is substantially orthogonal to both the direction of said magnetic field and the direction of oscillatory motion of said liquid, whereby an alternating current output signal is generated in said conductor means at a frequency corresponding to the frequency of said oscillatory motion of said liquid.

2. The thermoacoustic magnetohydrodynamic electrical generator defined in claim 1 wherein said magnet includes opposing spaced-apart magnet pole pieces, and wherein said housing comprises an elongate tube closed at its opposite ends, and which is cylindrical in regions adjacent to said closed ends and which is rectangular in cross section in a region between said pole pieces, said rectangular region being positioned between said pole pieces with the major width of said rectangular cross section extending substantially orthogonal to the direction of said magnetic field.

3. The thermoacoustic magnetohydrodynamic generator defined in claim 1 further comprising a low-loss, low-inductance transformer for transforming said alternating current to a signal having a higher voltage and lower current than said output signal.

4. The thermoacoustic magnetohydrodynamic generator defined in claim 3 wherein said transformer comprises a closed-loop core formed of multiple windings of a grain-oriented nickel-iron tape.

5. The thermoacoustic magnetohydrodynamic generator defined in claim 3 wherein said transformer includes a closed-loop transformer core and wherein said first conductor means comprises a conductor plate connected to one side of said housing and extending therefrom to said transformer core, and wherein said second conductor means comprises upper and lower conductor segments which are integrally joined together and connected to the opposite side of said housing, and wherein said upper and lower segments of said second conductor extend across the upper and lower surfaces respectively of said housing and are backed by said pole pieces of said magnet, whereby said housing is reinforced by means of said magnet pole pieces and said conductor means to withstand high dynamic internal liquid pressures.

6. The thermoacoustic magnetohydrodynamic generator defined in claim 5 wherein said upper and lower segments of said second conductor means each extend from said housng to said transformer core and make a single wrap in opposite directions around opposite sides of said closed-loop core, with said conductor plate of said first conductor means being sandwiched between said upper and lower segments and extending through said core to be integrally joined to said upper and lower conductor segments.

7. The thermoacoustic magnetohydrodynamic generator defined in claim 6 wherein said transformer includes a secondary winding wrapped around opposite sides of said closed-loop core between said core and said upper and lower conductor segments.

* * * * *